United States Patent
Uhlir-Tsang et al.

(10) Patent No.: US 7,083,671 B2
(45) Date of Patent: *Aug. 1, 2006

(54) METALLIZED DYE-BASED INK-JET INKS WITH IMPROVED OZONE FASTNESS

(75) Inventors: Linda C. Uhlir-Tsang, Corvallis, OR (US); John R. Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/892,623

(22) Filed: Jul. 16, 2004

(65) Prior Publication Data

US 2006/0011098 A1    Jan. 19, 2006

(51) Int. Cl.
*C09D 11/02* (2006.01)
*B41M 5/40* (2006.01)
*B41J 2/01* (2006.01)

(52) U.S. Cl. .............. 106/31.58; 106/31.49; 106/31.51; 106/31.52; 428/32.34; 347/100

(58) Field of Classification Search ............ 106/31.58, 106/31.49, 31.51, 31.52; 428/32.34; 347/100
See application file for complete search history.

(56) References Cited

U.S. PATENT DOCUMENTS

| 5,089,050 | A | | 2/1992 | Vieira et al. | |
|---|---|---|---|---|---|
| 5,102,459 | A | * | 4/1992 | Ritter et al. | 106/31.36 |
| 5,509,957 | A | | 4/1996 | Toan et al. | |
| 5,876,491 | A | | 3/1999 | Gunn et al. | |
| 2004/0103820 | A1 | | 6/2004 | Jung et al. | |
| 2005/0142306 | A1 | * | 6/2005 | Uhlir-Tsang et al. | 428/32.34 |

FOREIGN PATENT DOCUMENTS

| EP | 1 029 703 A | 8/2000 |
|---|---|---|
| GB | 2 088 777 A | 6/1982 |
| JP | 54-68303 | 6/1979 |
| JP | 2004/231895 | 8/2004 |
| JP | 2004/231897 | 8/2004 |

OTHER PUBLICATIONS

English translation of JP 2004/231895, pp. 1-8, Aug. 2004.*
English translation of JP 2004/231897, pp. 1-8, Aug. 2004.*
STN Reg file search of dye structures, pp. 1-6, Feb. 16, 2006.*

* cited by examiner

*Primary Examiner*—Helene Klemanski

(57) ABSTRACT

In accordance with embodiments of the present invention, an ink-jet ink can comprise a liquid vehicle including a halophenol and a metallized dye. Alternatively, a system for printing images with improved ozone fastness can comprise a printing medium including an ink-receiving layer coated thereon, wherein the ink-receiving layer includes semi-metal oxide or metal oxide particulates, and an ink-jet ink configured for printing on printing medium. The ink-jet ink can comprise a liquid vehicle including a protonated phenol devoid of water solubilizing moieties, and a metallized dye.

35 Claims, No Drawings

//METALLIZED DYE-BASED INK-JET INKS WITH IMPROVED OZONE FASTNESS

FIELD OF THE INVENTION

The present invention relates generally to metallized dye-based ink-jet inks. More particularly, the present invention relates to metallized dye-based ink-jet inks having improved ozone fastness when printed on semi-metal oxide or metal oxide-containing porous media.

BACKGROUND OF THE INVENTION

In ink-jet technology, image quality of high-resolution images can be a function of both the ink-jet ink used to produce an image, and the print medium upon which the image is printed. Desirable attributes of print quality include saturated colors, high gloss and gloss uniformity, and freedom of grain and coalescence, among other characteristics.

Once a high-resolution image is printed, however, another major issue arises, namely, image permanence relating to how long the quality of the image will last. As the photo industry continues to move from film to digital image methods, the issue of image permanence becomes much more important.

With respect to much of the print media currently on the market, printed images commonly have undesirable attributes in the area of image permanence. One such undesirable attribute is the gradual dye-fade observed when dye-based ink-jet inks are printed on porous media. Such fade has been shown to be caused by air, and more particularly, by small amounts of ozone in the air. It appears that, over time, ozone reacts with many dyes commonly used in ink-jet inks, thus causing them to break down and to lose or diminish their intended color properties. It should be noted that dye-fade is more of a problem with certain dyes than with others. For example, cyan dyes tend to be affected to a greater extent by the presence of ozone in the air than do other dyes.

Along with dye-fade, another significant undesirable attribute is color-shift. It has been observed that when ozone reacts with ink-jet ink dyes, the intended color properties of a given dye may shift to another wavelength value along the visible spectrum. This effect causes a gradual change in the perceived colors of the printed image from what was originally intended by the dyes.

Both of these undesirable attributes, dye-fade and color-shift, gradually affect the perception of the printed image. Because the printed image is susceptible to these significant changes over time, many have been reluctant, especially in the graphics arts and photography industries, to embrace ink-jet printing of images intended to last a significant period of time.

As such, it would be beneficial to develop ink-jet inks that can be printed on semi-metal oxide or metal oxide-containing porous media, while minimizing the affects of exposure to atmospheric ozone.

SUMMARY OF THE INVENTION

It has been recognized that it would be advantageous to improve ozone fastness by including certain additives in ink-jet inks. In accordance with this, an ink-jet ink that typically meets this criterion can comprise a liquid vehicle including a halophenol, and can further comprise a metallized dye.

In another embodiment, a system for printing images with improved ozone fastness can comprise a printing medium and an ink-jet ink. The printing medium can include an ink-receiving layer coated thereon, wherein the ink-receiving layer includes semi-metal oxide or metal oxide particulates. The ink-jet ink can be configured for printing on printing medium, and can comprise a liquid vehicle including a protonated phenol devoid of water solubilizing moieties, and can further comprise a metallized dye.

In another embodiment, a method for printing images with improved ozone fastness can comprise the step of jetting an ink-jet ink onto a printing medium. The printing medium can include an ink-receiving layer coated thereon, and the ink-receiving layer can include semi-metal oxide or metal oxide particulates. The ink-jet ink can comprise a liquid vehicle including a protonated phenol devoid of water solubilizing moieties, and can further comprise a metallized dye.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, plasticizers, and/or cosolvents in some embodiments.

The term "metallized dye" includes dyes that have a transition metal that is chelated, coordinated, or complexed to the dye molecule as an integral part of the dye structure. Metallized dyes do not include dyes that merely include a metal counter ion. For example, DB199Na is a copper phthalocyanine dye having a sodium counter ion. The copper component makes this particular dye a "metallized" dye, whereas the sodium counter ion does not.

When referring to a phenol composition, the term "protonated" indicates that at least a relatively significant portion of the phenol compositions are in a hydroxyl (—OH) form, rather than in a deprotonated (—O$^-$) form. This can be function of the pH of the ink composition. In other words, the term "protonated" indicates that the pKa value of the phenol is either greater than the pH value of the ink-jet ink once printed on the print medium, or alternatively, is slightly lower, e.g., no more than about 1 pH unit lower, than the pH of the ink-jet ink once printed on the print medium, such that at least a relatively significant portion of the phenols are protonated in the ink, or alternatively, when applied to the print medium. Depending on the relative values, substantially all of the phenols can be protonated, or a significant plurality of the amines can be protonated.

"pKa" is defined as the pH at which half of a composition is protonated and half is deprotonated. As the pH is increased, fewer molecules are protonated. Likewise, as the pH is decreased, more molecules will be protonated. For every whole unit of increased pH of the composition containing the phenol composition compared to the pKa value of the phenol composition itself, there will be 10 times fewer protonated phenols present. Thus, in accordance with one embodiment of the present invention, the pKa can either be higher than the pH of the ink-jet printed on the print medium, or alternatively, can be as much as 1 unit lower than the pH of the ink-jet printed on the print medium. In either case, the phenol additive can still be considered to be "protonated" in accordance with embodiments of the present invention.

The term "halophenol" refers to compositions that include a phenol or phenol derivative, and a halogen attached to the phenol or phenol derivative. The phenol can be derivatized with a water solubilizing group, bulky group, or other desired group to achieve a desired affect. Typically, the halogen, e.g., chloro or bromo group, is attached directly to the aromatic ring of the phenol.

The term "solubilizing moieties" refers to acidic groups that can be attached to organic compositions in order to improve their solubility. Examples include sulfonic acid groups, carboxylic acid groups, etc.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, an ink-jet ink can comprise a liquid vehicle including a halophenol, and can further comprise a metallized dye.

In another embodiment, a system for printing images with improved ozone fastness can comprise a printing medium and an ink-jet ink. The printing medium can include an ink-receiving layer coated thereon, wherein the ink-receiving layer includes semi-metal oxide or metal oxide particulates. The ink-jet ink can be configured for printing on printing medium, and can comprise a liquid vehicle including a protonated phenol devoid of water solubilizing moieties, and can further comprise a metallized dye.

In another embodiment, a method for printing images with improved ozone fastness can comprise the step of jetting an ink-jet ink onto a printing medium. The printing medium can include an ink-receiving layer coated thereon, and the ink-receiving layer can include semi-metal oxide or metal oxide particulates. The ink-jet ink can comprise a liquid vehicle including a protonated phenol devoid of water solubilizing moieties, and can further comprise a metallized dye.

Ink-jet Ink Composition

In accordance with embodiments of the present invention, it has been discovered that phenol compositions can improve ozone fastness of ink-jet inks, particularly when printed on porous media substrates such as semi-metal oxide or metal oxide coated media substrates. The phenol used can come in a variety of forms, including in the form of a halophenol, a phenol that is protonated in the ink, and/or a phenol devoid of traditional water solubilizing moieties, e.g., sulfonic acid, carboxylic acid, etc. These additives are particularly useful when added to metallized dye-containing ink-jet inks, such as copper- or nickel-containing dyes. One class of dyes that can be used includes phthalocyanine dyes. Another class of dyes that can be used include azo dyes. Application of an ink-jet ink to a media substrate in accordance with embodiments of the present invention can be by thermal or piezo ink-jet application processes.

In accordance with embodiments of the present invention, the phenol, such as a halophenol, a phenol that is protonated, and/or a phenol devoid of traditional water solubilizing moieties, can be present in the ink-jet ink composition at from 0.01 wt % to 10 wt %. Further, the metallized dye can be present in the ink-jet ink composition at from 040.01 wt % to 10 wt %.

Exemplary halophenol compositions that can be used include chlorophenols, such as 2-chlorophenol, 3-chlorophenol, and 4-chlorophenol. Likewise, the halophenol can be a bromophenol, such as 2-bromophenol, 3-bromophenol, and 4-bromophenol. In yet another embodiment the halophenol can be halophenoxyphenol, such as Triclosan™ (5-chloro-2-(2,4-dichlorophenoxy)phenol).

As mentioned, the ink-jet ink compositions of the present invention are typically prepared in an aqueous formulation or liquid vehicle which can include water, cosolvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly (ethylene glycol) alkyl ethers, higher homologs of poly (ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 0.1 wt % to about 40 wt %, and in one embodiment is from about 5 wt % to about 15 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet inks of this invention can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of liquid vehicle or other additives for use with thermal ink-jet systems often requires more care, as thermal ink-jet systems are less forgiving than piezo ink-jet systems.

Porous Coated Media

In accordance with one aspect of the present invention, systems and methods are provided that utilize a media substrate coated with an ink-receiving layer. The coated print media typically includes a substrate and a porous ink-receiving layer deposited on the substrate. The substrate can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the porous ink-receiving layer, inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. Typically, the inorganic particulates are present in the coating composition at from 60 wt % to 95 wt %. In a few specific embodiments, boehmite can be present in the coating composition at from 85 wt % to 95 wt %, or silica or silicates can be present in the coating composition at from 75 wt % to 85 wt %.

In order to bind the inorganic particulates together in the porous coating composition, a polymeric binder is typically included. Exemplary polymeric binders that can be used include polyvinyl alcohol including water-soluble copolymers thereof; polyvinyl acetate; polyvinyl pyrrolidone; modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol; conjugated diene copolymer latexes including maleic anhydride resin, styrene-butadiene copolymer, and the like; acrylic polymer latexes including polymers and copolymers of acrylic and methacrylic acids, and the like; vinyl polymer latexes including ethylene-vinyl acetate copolymers; functional group-modified latexes including those obtained by modifying the above-mentioned polymers with monomers containing functional groups (e.g. carboxyl, amino, amido, sulfo, etc.); aqueous binders of thermosetting resins including melamine resins, urea resin, and the like; synthetic resin binders including polymethyl methacrylate, polyurethane resin, polyester resin, amide resin, vinyl chloride-vinyl acetate copolymer, polyvinyl butyral, and alkyl resins. Such binder can be present to bind the porous ink-receiving layer together, but can also be present in small enough amounts to maintain the porous nature of the porous ink-receiving layer. In accordance with embodiments of the present invention, the polymeric binder can be present in the coating composition at from 5 wt % to 40 wt %. In specific embodiments where boehmite is used, the polymeric binder can be present at from 3 wt % to 15 wt %. Alternatively, where silica or silicates are used, the polymeric binder can be present at from 10 wt % to 25 wt %. In another specific embodiment, the binder can be polyvinyl alcohol or derivatives thereof.

Optionally, the porous ink-receiving layer can also be modified with an ionic binding species or mordant known to interact with a predetermined class of colorants, thereby increasing permanence. Typical mordants that can be included in the coating composition (and thus, included in the porous ink-receiving layer) include hydrophilic, water dispersible, or water soluble polymers having cationic groups (amino, tertiary amino, amidoamino, pyridine, imine, and the like). These cationically modified polymers can be compatible with water-soluble or water dispersible binders and have little or no adverse effect on image processing or colors present in the image. Suitable examples of such polymers include, but are not limited to, polyquaternary ammonium salts, cationic polyamines, polyamidins, cationic acrylic copolymers, guanidine-formaldehyde polymers, polydimethyl diallylammonium chloride, diacetone acrylamide-dimethyldiallyl ammonium chloride, polyethyleneimine, and a polyethyleneimine adduct with epichlorhydrin. Aside from mordants, other optional components that can be present in the porous ink-receiving layer can include anionic surfactants, cationic surfactants, biocides, plasticizers, optical brighteners, viscosity modifiers, leveling agents, UV absorbers, hindered amine stabilizers, anti-ozonants, silane coupling agents, and/or other known additives. In addition to these additives, the semi-metal oxide or metal oxide particulates can be chemically surface-modified using silane coupling agents having functional moieties attached thereto.

The ink-receiving layer can be a single layer or a multi-layer coating designed to absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate. In one embodiment of the present invention, the depth of the ink-receiving layer formed by the coating composition can be from about 20 μm to about 60 μm. In accordance with a few specific embodiments, the thickness for boehmite-containing coating compositions can be from 40 μm to 55 μm, the thickness for silica- or silicate-containing coating compositions can be from 25 μm to 35 μm. If applied as a media topcoat, the thickness can range from 0.1 μm to 10 μm, and in a more specific embodiment, from 1 μm to 5 μm.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Ink-jet Ink Preparation

Several Test ink-jet ink compositions and Control ink-jet ink compositions were prepared according to Table 1 as follow:

TABLE 1

| Ingredient | Ink-jet ink formulations | |
| --- | --- | --- |
|  | Test ink-jet ink | Control ink-jet ink |
| [1]Metallized dye | 2 wt % | 2 wt % |
| Diethylene glycol | 10 wt % | 10 wt % |
| Triton X-100 | 1.5 wt % | 1.5 wt % |
| Trizma (Tris buffer) | 0.2 wt % | 0.2 wt % |
| [2]Phenol additive | 2 wt % | — |
| [3]Water | Balance | Balance |

[1]The metallized dyes that were tested included a copper phthalocyanine, a nickel phthalocyanine, and a nickel azo dye.
[2]The phenol additives that were tested included 2-chlorophenol, 2-bromophenol, 4-chlorophenol, 4, bromophenol, and a halophenoxyphenol known as Triclosan™ (5-chloro-2-(2,4-dichlorophenoxy)phenol).
[3]In the Control ink-jet ink, 2 wt % of additional water was added to compensate for the lack of the phenol additive.

Example 2

Ozone Fastness of Ink-jet Inks Printed on Porous Media

Various Test ink-jet inks which included various metallized dyes and phenol additives were compared to corresponding Control ink-jet inks without the phenol additive to determine the effectiveness of the phenol additive on ozone fastness. Specifically, the various Test and Control inks were printed on Epson Premium Glossy Photo Paper at 0.25 optical density (OD), 0.5 OD and 1.0 OD. Each printed sample was placed in a chamber having a 1 ppm ozone level by volume, a relative humidity of 50%, and a temperature of 30° C. Failure of each printed sample was defined as 30% OD loss. The data for each test is shown in Tables 2 to 6 below:

TABLE 2

| DB199Na Copper phthalocyanine | 0.25 Initial OD Time to Failure ppm*hr | 0.5 Initial OD Time to Failure ppm*hr | 1.0 Initial OD Time to Failure ppm*hr |
| --- | --- | --- | --- |
| 2-chlorophenol | >20 | 18.4 | 16.0 |
| Control | 18.6 | 15.9 | 15.3 |

TABLE 3

| DB199Na Copper phthalocyanine | 0.25 Initial OD Time to Failure ppm*hr | 0.5 Initial OD Time to Failure ppm*hr | 1.0 Initial OD Time to Failure ppm*hr |
| --- | --- | --- | --- |
| 2-bromophenol | 25.3 | 18.6 | 16.8 |
| Control | 20.2 | 18.2 | 17.6 |

TABLE 4

| DB199Na Copper phthalocyanine | 0.25 Initial OD Time to Failure ppm*hr | 0.5 Initial OD Time to Failure ppm*hr | 1.0 Initial OD Time to Failure ppm*hr |
| --- | --- | --- | --- |
| 4-bromophenol | 30.9 | 20.3 | 18.5 |
| Control | 20.0 | 16.8 | 17.2 |

TABLE 5

| DJR-814 Nickel Azo | 0.25 Initial OD Time to Failure ppm*hr | 0.5 Initial OD Time to Failure ppm*hr | 1.0 Initial OD Time to Failure ppm*hr |
|---|---|---|---|
| 2-chlorophenol | 5.1 | 4.7 | 6.6 |
| Control | 3.9 | 4.0 | 4.2 |

TABLE 6

| Nickel Phthalocyanine Tetrasodium sulfonate | 0.25 Initial OD Time to Failure ppm*hr | 0.5 Initial OD Time to Failure ppm*hr | 1.0 Initial OD Time to Failure ppm*hr |
|---|---|---|---|
| 2-chlorophenol | 18.7 | 19.7 | 20.0 |
| Control | 13.9 | 17.6 | 17.2 |

As can be seen from Tables 2–6, nearly all examples showed in improvement in ozone fastness when the metallized dye-containing ink-jet ink included a phenol additive.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. An ink-jet ink, comprising:
   a liquid vehicle including a halophenol; and
   a metallized dye.
2. An ink-jet ink as in claim 1, wherein the halophenol is present in the ink-jet ink composition at from 0.01 wt % to 10 wt %.
3. An ink-jet ink as in claim 1, wherein the metallized dye is present in the ink-jet ink composition at from 0.01 wt % to 10 wt %.
4. An ink-jet ink as in claim 1, wherein the halophenol is a chlorophenol.
5. An ink-jet ink as in claim 4, wherein the chlorophenol is selected from the group consisting of 2-chlorophenol, 4-chlorophenol, and mixtures thereof.
6. An ink-jet ink as in claim 1, wherein the halophenol is a bromophenol.
7. An ink-jet ink as in claim 4, wherein the bromophenol is selected from the group consisting of 2-bromophenol, 4-bromophenol, and mixtures thereof.
8. An ink-jet ink as in claim 1, wherein the halophenol is a halophenoxyphenol.
9. An ink-jet ink as in claim 1, wherein the halophenol is devoid of water solubilizing moieties.
10. An ink-jet ink as in claim 1, wherein the halophenol is protonated.
11. An ink-jet ink as in claim 1, wherein the metallized dye is a phthalocyanine dye.
12. An ink-jet ink as in claim 1, wherein the phthalocyanine dye is a copper phthalocyanine dye.
13. An ink-jet ink as in claim 12, wherein the phthalocyanine dye is a nickel phthalocyanine dye.
14. An ink-jet ink as in claim 1, wherein the metallized dye is a nickel azo dye.
15. A system for printing images with improved ozone-fastness, comprising:
   a) a printing medium including an ink-receiving layer coated thereon, said ink-receiving layer including semi-metal oxide or metal oxide particulates; and
   b) an ink-jet ink configured for printing on printing medium, said ink-jet ink, comprising:
      i) a liquid vehicle including a protonated phenol devoid of water solubilizing moieties, and
      ii) a metallized dye.
16. A system as in claim 15, wherein the phenol is a halophenol.
17. A system as in claim 15, wherein the phenol is present in the ink-jet ink composition at from 0.01 wt % to 10 wt %.
18. A system as in claim 15, wherein the metallized dye is present in the ink-jet ink composition at from 0.01 wt % to 10 wt %.
19. A system as in claim 16, wherein the halophenol is a chlorophenol.
20. A system as in claim 16, wherein the halophenol is a bromophenol.
21. A system as in claim 16, wherein the halophenol is a halophenoxyphenol.
22. A system as in claim 15, wherein the metallized dye is a copper or nickel phthalocyanine dye.
23. A system as in claim 15, wherein the metallized dye is a nickel azo dye.
24. A system as in claim 15, wherein the semi-metal oxide or metal oxide particulates are selected from the group consisting of silica, alumina, boehmite, silicates, titania, zirconia, calcium carbonate, clays, and combinations thereof.
25. A method for printing images with improved ozone-fastness, comprising jetting an ink-jet ink onto a printing medium, said printing medium including an ink-receiving layer coated thereon, said ink-receiving layer comprising semi-metal oxide or metal oxide particulates, said ink-jet ink comprising a liquid vehicle including a protonated phenol devoid of water solubilizing moieties and further including a metallized dye.
26. A method as in claim 25, wherein the phenol is a halophenol.
27. A method as in claim 25, wherein the phenol is present in the ink-jet ink composition at from 0.01 wt % to 10 wt %.
28. A method as in claim 25, wherein the metallized dye is present in the ink-jet ink composition at from 0.01 wt % to 10 wt %.
29. A method as in claim 26, wherein the halophenol is a chlorophenol.
30. A method as in claim 26, wherein the halophenol is a bromophenol.
31. A method as in claim 26, wherein the halophenol is a halophenoxyphenol.
32. A method as in claim 31, wherein the metallized dye is a copper or nickel phthalocyanine dye.
33. A method as in claim 31, wherein the metallized dye is a nickel azo dye.
34. A method as in claim 31, wherein the semi-metal oxide or metal oxide particulates are selected from the group consisting silica, alumina, boehmite, silicates, titania, zirconia, calcium carbonate, clays, and combinations thereof.
35. A method as in claim 31, wherein the jetting step is by a thermal ink-jetting process.

* * * * *

UNITED STATES PATENT AND TRADEMARK OFFICE
CERTIFICATE OF CORRECTION

| | | |
|---|---|---|
| PATENT NO. | : 7,083,671 B2 | Page 1 of 1 |
| APPLICATION NO. | : 10/892623 | |
| DATED | : August 1, 2006 | |
| INVENTOR(S) | : Uhlir-Tsang et al. | |

It is certified that error appears in the above-identified patent and that said Letters Patent is hereby corrected as shown below:

Col. 4 (line 30), delete "040.01" and insert therefor --0.01--.

Signed and Sealed this

Nineteenth Day of June, 2007

JON W. DUDAS
*Director of the United States Patent and Trademark Office*